United States Patent
Braedt (12)

(10) Patent No.: US 11,866,126 B2
(45) Date of Patent: Jan. 9, 2024

(54) MULTI-SPROCKET ASSEMBLY FOR A BICYCLE

(71) Applicant: SRAM DEUTSCHLAND GmbH, Schweinfurt (DE)

(72) Inventor: Henrik Braedt, Hambach (DE)

(73) Assignee: SRAM DEUTSCHLAND GmbH, Schweinfurt (DE)

( * ) Notice: Subject to any disclaimer, the term of this patent is extended or adjusted under 35 U.S.C. 154(b) by 270 days.

(21) Appl. No.: 17/015,851

(22) Filed: Sep. 9, 2020

(65) Prior Publication Data
US 2021/0053651 A1 Feb. 25, 2021

Related U.S. Application Data

(63) Continuation of application No. 15/844,070, filed on Dec. 15, 2017, now Pat. No. 10,800,488, which is a continuation of application No. 14/883,564, filed on Oct. 14, 2015, now Pat. No. 9,873,481.

(30) Foreign Application Priority Data

Oct. 14, 2014 (DE) .................. 10 2014 014 972.2
Oct. 8, 2015 (DE) .................. 10 2015 219 522.8

(51) Int. Cl.
    *B62M 9/12* (2006.01)
    *B62M 9/10* (2006.01)

(52) U.S. Cl.
    CPC ............... *B62M 9/12* (2013.01); *B62M 9/10* (2013.01)

(58) Field of Classification Search
    CPC ......... B62M 9/10; B62M 9/105; F16H 55/30; F16H 55/303; Y10T 74/2165

USPC ......................................................... 474/160
See application file for complete search history.

(56) References Cited

U.S. PATENT DOCUMENTS

| | | | | |
|---|---|---|---|---|
| 590,649 A | * | 9/1897 | Ribyn, Jr. .......... | F16H 55/30 474/156 |
| 3,956,943 A | * | 5/1976 | Yamasaki ........... | F16H 55/30 474/160 |
| 3,969,943 A | * | 7/1976 | Ohno .................. | G01J 5/06 374/126 |
| 3,969,947 A | * | 7/1976 | Martin ................ | F16H 55/30 474/152 |
| 4,174,642 A | * | 11/1979 | Martin ................ | F16H 55/30 474/152 |
| 4,598,608 A | * | 7/1986 | Ueno .................. | B62M 9/105 74/448 |

(Continued)

FOREIGN PATENT DOCUMENTS

DE     3887076 T2     7/1994
DE     4418407 A1     12/1994

(Continued)

*Primary Examiner* — Henry Y Liu

(57) ABSTRACT

A multi-sprocket arrangement for a rear wheel hub of a bicycle may have improved gearshift characteristics, reduced vibrations during skewed running, and improved wear characteristics. The multi-sprocket arrangement includes a multiplicity of sprockets of different diameters, wherein at least one of the sprockets has a multiplicity of teeth. Also on the circumference of said sprocket, as viewed in a circumferential direction, at least one sequence of teeth is provided in which, with regard to their material thickness, a thin tooth is followed by a thick tooth which is followed in turn by another thin tooth.

17 Claims, 14 Drawing Sheets

(56) References Cited

U.S. PATENT DOCUMENTS

| | | | | |
|---|---|---|---|---|
| 4,889,521 | A * | 12/1989 | Nagano | B62M 9/10 474/164 |
| 5,087,226 | A * | 2/1992 | Nagano | B62M 9/10 474/160 |
| 5,192,248 | A * | 3/1993 | Nagano | B62M 9/105 474/140 |
| 5,192,249 | A * | 3/1993 | Nagano | B62M 9/10 474/160 |
| 5,413,534 | A * | 5/1995 | Nagano | B62M 9/105 474/160 |
| 5,503,598 | A * | 4/1996 | Neuer | B62M 9/10 474/160 |
| 5,514,042 | A * | 5/1996 | Liou | B62M 9/10 474/160 |
| 5,545,096 | A * | 8/1996 | Su | B62M 9/10 474/160 |
| 5,609,536 | A * | 3/1997 | Hsu | B62M 9/10 474/160 |
| 5,690,570 | A * | 11/1997 | Chang | B62M 9/10 474/158 |
| 5,738,603 | A * | 4/1998 | Schmidt | B62M 9/10 474/158 |
| 5,876,296 | A * | 3/1999 | Hsu | B62M 9/10 474/140 |
| 5,935,033 | A * | 8/1999 | Tseng | B62M 9/105 474/155 |
| 5,971,878 | A * | 10/1999 | Leng | B62M 9/10 474/160 |
| 6,007,442 | A * | 12/1999 | Schmidt | B62M 9/10 474/122 |
| 6,013,001 | A * | 1/2000 | Miyoshi | B62M 9/10 474/160 |
| 6,045,472 | A * | 4/2000 | Sung | B62M 9/10 474/158 |
| 6,139,456 | A * | 10/2000 | Lii | B62M 9/10 474/158 |
| 6,203,462 | B1 * | 3/2001 | Takamori | F16H 7/06 474/160 |
| 6,264,575 | B1 * | 7/2001 | Lim | F16D 41/30 192/64 |
| 6,340,338 | B1 * | 1/2002 | Kamada | B62M 9/122 474/160 |
| 6,666,786 | B2 * | 12/2003 | Yahata | B62M 9/105 474/158 |
| 6,860,171 | B1 * | 3/2005 | Nanko | B62M 25/02 74/594.1 |
| 7,871,347 | B2 * | 1/2011 | Kamada | B62M 9/10 474/160 |
| 7,883,437 | B2 * | 2/2011 | Braedt | F16H 55/30 474/158 |
| 8,092,329 | B2 * | 1/2012 | Wickliffe | B62M 9/12 474/160 |
| 8,096,908 | B2 * | 1/2012 | Oishi | B62M 9/10 474/160 |
| 8,226,511 | B2 * | 7/2012 | Kamada | B62M 9/10 474/160 |
| 8,506,436 | B2 * | 8/2013 | Wickiffe | F16H 55/303 474/160 |
| 8,517,874 | B2 * | 8/2013 | Reiter | B62M 9/10 474/160 |
| 8,617,015 | B2 * | 12/2013 | Wickliffe | B62M 9/10 474/140 |
| 8,882,619 | B2 * | 11/2014 | Braedt | B62M 9/10 474/156 |
| 9,182,027 | B2 * | 11/2015 | Reiter | B62M 9/00 |
| 9,316,302 | B2 * | 4/2016 | Braedt | F16H 55/30 |
| 9,328,814 | B2 * | 5/2016 | Wesling | B62M 9/10 |
| 9,334,014 | B2 * | 5/2016 | Fukunaga | F16H 55/30 |
| 9,463,844 | B2 * | 10/2016 | Fukunaga | B62M 9/10 |
| 9,540,070 | B2 * | 1/2017 | Watarai | F16H 55/30 |
| 10,295,041 | B2 * | 5/2019 | Akanishi | F16H 55/30 |
| 10,359,106 | B2 * | 7/2019 | Akanishi | B62M 9/10 |
| 10,378,637 | B2 * | 8/2019 | Ooishi | B62M 9/10 |
| 2002/0098934 | A1 * | 7/2002 | Wigsten | F16H 55/30 474/212 |
| 2003/0073530 | A1 * | 4/2003 | Mao | B62M 9/10 474/160 |
| 2004/0009838 | A1 * | 1/2004 | Valle | B62M 9/105 474/160 |
| 2004/0043855 | A1 * | 3/2004 | Wei | B62M 9/10 474/160 |
| 2005/0079940 | A1 * | 4/2005 | Reiter | F16H 55/30 474/160 |
| 2005/0282671 | A1 * | 12/2005 | Emura | B62M 9/105 474/160 |
| 2006/0128511 | A1 * | 6/2006 | Oishi | B62M 9/10 474/160 |
| 2006/0154767 | A1 * | 7/2006 | Kamada | B62M 9/10 474/160 |
| 2007/0054768 | A1 * | 3/2007 | Miyazawa | F16H 55/30 474/152 |
| 2007/0060428 | A1 * | 3/2007 | Meggiolan | B62M 9/10 474/160 |
| 2009/0098966 | A1 * | 4/2009 | Kamada | B62M 9/10 474/160 |
| 2011/0092327 | A1 * | 4/2011 | Oishi | B62M 9/10 474/160 |
| 2013/0139642 | A1 * | 6/2013 | Reiter | F16H 55/303 74/594.2 |
| 2013/0184110 | A1 * | 7/2013 | Reiter | F16H 55/30 474/152 |
| 2014/0338494 | A1 * | 11/2014 | Sugimoto | B62M 9/10 474/158 |
| 2015/0198231 | A1 * | 7/2015 | Emura | B62M 9/105 474/156 |

FOREIGN PATENT DOCUMENTS

| | | |
|---|---|---|
| DE | 4330989 A1 | 3/1995 |
| DE | 69104865 T2 | 3/1995 |
| DE | 102012023819 A1 | 6/2013 |
| DE | 102014007274 A1 | 11/2014 |
| DE | 102014019528 A1 | 7/2015 |
| EP | 0444556 A1 | 9/1991 |
| JP | S56042489 A | 4/1981 |
| JP | S60104866 A | 6/1985 |
| JP | H01171795 U | 12/1989 |
| JP | 2000355295 A | 12/2000 |
| JP | 2007198403 A | 8/2007 |
| TW | 201404658 A | 2/2014 |

* cited by examiner

MULTI-SPROCKET ASSEMBLY FOR A BICYCLE

This application is a continuation of U.S. patent application Ser. No. 15/844,070, filed Dec. 15, 2017, which is a continuation of U.S. patent application Ser. No. 14/883,564, filed Oct. 14, 2015, now U.S. Pat. No. 9,873,481, issued Jan. 23, 2018, which claims the benefit of DE 10 2014 014 972.2, filed on Oct. 14, 2014 and DE 10 2015 219 522.8, filed on Oct. 8, 2015, the contents of which are herein incorporated in their entirety.

FIELD OF THE INVENTION

The invention relates to a multi-sprocket arrangement for a rear wheel hub of a bicycle with improved gearshift characteristics, reduced vibrations during skewed running, and improved wear characteristics.

BACKGROUND

Document DE 10 2012 023 819 A1 presents a front sprocket for attachment to a pedal crank of a bicycle, said sprocket being characterized by improved chain guidance in relation to conventional sprockets. The improved guidance characteristics make it possible, to dispense with additional chain guides when using a single such sprocket on a pedal crank of a bicycle. This is the case even if no chain guide of a chain derailleur is provided. This characteristic may be an advantage in the case of bicycles for off-road use and in the case of which, owing to unevenness in the terrain and in the event of intense steering movements, the chain has a tendency to jump off the sprocket. The improved guidance characteristics are due at least partially to thick and thin teeth of the sprocket which are arranged in alternating fashion in the circumferential direction, as viewed in the axial direction of the pedal crank.

Furthermore, said teeth may be of particularly long form in a radial direction, wherein the tooth spaces may be formed so as to be only insignificantly larger in a circumferential direction than the chain rollers received therein. Furthermore, it is possible to provide free spaces in order to provide space for the inner links of the chain, which project relative to the chain rollers.

In the case of said prior art, only one of said sprockets is provided on a pedal crank, such that a front derailleur can be dispensed with. The need for the roller-type drive chain to be changed over to an adjacent sprocket in the load strand, which normally poses high demands due to chain tension forces prevailing in the load strand, is thus eliminated. The stated sprockets are not suitable for use on a rear-wheel hub, because the exceptionally good chain guidance characteristics oppose a changeover or shift to an adjacent sprocket.

Similar sprocket arrangements are also known from US 2014/0338494 A1 and DE 10 2014 019 528 A1.

The gearshift processes and associated requirements at multi-sprocket arrangements of a pedal crank, however, differ significantly from those of a multi-sprocket arrangement for a rear wheel hub of a bicycle. In the case of a driving sprocket (at the pedal crank), the chain roller is received in each case by the load flank of the sprocket. The drive direction defines that the gearshift process must be performed in the load strand. In the case of a driven sprocket, for example a pinion of a pinion cassette mounted on a bicycle rear wheel, the chain roller runs in on or close to the run-in flank, in the idle strand of the drive. The chain guidance is performed by the gearshift mechanism toothed roller, such that the run-in situation onto the respective sprocket does not involve significant skewed running. This gives rise to completely different demands being placed on the gearshift, and on the guidance of the chain therefor, for a rear sprocket (pinion) on the rear wheel of a bicycle as opposed to a front sprocket on the pedal crank of a bicycle.

It is an object of the present invention to provide a multi-sprocket arrangement for a rear wheel hub of a bicycle, which multi-sprocket arrangement exhibits improved shifting characteristics, in particular during a shift to sprockets of relatively small diameter and during gearshift processes with large differences in numbers of teeth. Furthermore, it is the intention to improve the skewed-running characteristics and reduce wear.

SUMMARY AND DESCRIPTION

A multi-sprocket arrangement for a rear wheel hub of a bicycle includes a multiplicity of sprockets of different diameters, which sprockets in particular each have an even number of teeth. Here, on the circumference of at least one of the sprockets, there is provided at least one sequence of teeth in which, with regard to their material thickness as viewed in a direction perpendicular to the circumferential direction, a thin tooth followed by a thick tooth followed in turn by a thin tooth are arranged in series. The at least one sprocket has at least one passage recess, in particular in the form of an impression or of a recess produced by material removal, which forms at least one gearshift channel, or path, and permits a shift of a chain which is in engagement with one of the sprockets such that said chain engages with an adjacent sprocket.

The gearshift path can thus be provided, between teeth of adjacent sprockets, as a means for the passage of the chain through a toothing on a sprocket of relatively large diameter with a relatively large number of teeth, in order that the chain can disengage from the teeth on the sprocket in question and can change over to the adjacent sprocket of relatively small diameter or with a relatively small number of teeth. In addition or alternatively, a gearshift path may also be provided in order that the chain can disengage from the teeth on the relatively small sprocket in question and can change over to the adjacent sprocket of relatively large diameter or with a relatively large number of teeth.

In one embodiment, it is possible for a passage recess on at least one of the teeth, which forms a passage tooth, of one of the sprockets of relatively large diameter to be provided for the passage of an inner link of the chain in order for the chain to descend onto an adjacent sprocket of relatively small diameter. In a further embodiment, a passage recess on at least one of the teeth, which forms a passage tooth, of one of the sprockets of relatively small diameter may be provided for the passage of an inner link or of an outer link of the chain in order for the chain to ascend onto an adjacent sprocket of relatively large diameter.

Furthermore, the phase relationship between adjacent sprockets may be configured such that synchronicity between the chain elements and corresponding associated teeth of a sprocket of relatively small diameter is produced. In this way, the inner link elements or outer link elements re-engaging with the sprocket of relatively small diameter can converge on a corresponding associated tooth. It can thus be ensured that an inner link element converges on a thin tooth and an outer link element correspondingly converges on a thick tooth. Here, too, "thin" and "thick" relate to the material thickness of the respective tooth in a direction perpendicular to the circumferential direction of the associated sprocket, that is to say substantially parallel to the direction of the respective axis of rotation.

In an embodiment, during a shift of the chain from a relatively large sprocket to a relatively small sprocket, an inner link element runs laterally past a thin tooth of the sprocket of relatively large diameter ("inner-link passage") in order that the chain disengages from the toothing of the sprocket of relatively large diameter.

Correspondingly, in an embodiment, it may be provided that at least one sprocket of relatively small diameter is oriented, in terms of phase, with respect to an adjacent sprocket of relatively large diameter such that during a shift of the chain from the sprocket of relatively large diameter to the adjacent sprocket of relatively small diameter synchronicity between the teeth of the sprocket of relatively small diameter and respectively associated chain elements of the chain is realized. In other words, the at least one sprocket of relatively small diameter may be rotationally offset with respect to the adjacent sprocket of relatively large diameter by a particular angle of rotation about a common axis of rotation. In this case, the magnitude of the angle of rotation may be defined in a manner dependent on the chain, the geometry of the teeth, and/or the different diameters of the sprockets. For example, the magnitude of the angle of rotation may be defined in order to ensure an intended engagement of the chain on the at least one sprocket of relatively small diameter during the shift to the smaller sprocket from the adjacent sprocket of relatively large diameter. In particular, the gearshift paths may be arranged such that during a shift of the chain to an adjacent sprocket it is always the case that an outer link converges on a thick tooth.

In this context, it is pointed out that the arrangement of the gearshift paths and of adjacent sprockets relative to one another may, in one embodiment, be selected such that during a shift from one sprocket to an adjacent sprocket the chain strand or chain part running between the two sprockets runs substantially linearly and tangentially with respect to the base circle of the sprocket of relatively small diameter. The above mentioned angle of rotation or angular offset is thus selected such that the spacing between the final tooth which is engaged with the chain on the relatively large sprocket to the first tooth which is engaged with the chain on the relatively small sprocket amounts substantially to a multiple of the chain pitch.

In a further embodiment, it is at least possible for the at least one sprocket of relatively small diameter to have along its circumference multiple sequences of thick and thin teeth with regard to the material thickness of the sprocket in a direction perpendicular to the circumferential direction.

In a further embodiment, it is possible for at least one tooth of one or more of the multiplicity of sprockets to have a support edge which is designed to support an outer link of the chain in a radially inward direction with respect to the axis of rotation of the respectively associated sprocket.

An embodiment may involve a thinner-link passage. In this embodiment the inner links of an inner link element run past a tooth at one side, before the outer links of a subsequent chain element flank a tooth on both sides, as has already been implemented in conventional sprockets. For example, document EP 0 642 972 A1 presents an inner-link passage for the chain to descend from the relatively large pinion or sprocket to the relatively small pinion or sprocket.

An outer-link passage for the chain to descend from the relatively large sprocket to the relatively small sprocket is technically not expedient. This is because, an impression or gearshift path, would have to be formed with too great a depth to be measured in a direction parallel to the axis of rotation. An inner-link passage for the chain to ascend from the relatively small pinion or sprocket to the relatively large pinion sprocket emerges from document EP 0 313 345 A1, and from document DE 44 18 407 A1. An outer-link passage is however likewise possible and expedient in the case of the chain ascending from the relatively small pinion or sprocket to the relatively large pinion or sprocket.

In the case of conventional sprockets, it has been achieved only to a limited extent that the chain always changes over to the sprocket of relatively small diameter at gearshift paths. In the case of conventional sprockets, the chain often departs from the toothing on the sprocket of relatively large diameter if the phase assignment is incorrect. In such situations maintaining the chain on the toothing may require a correspondingly large force on the chain, or a correspondingly large deflection of the chain guide of a rear gearshift mechanism. In these situations, a front-side impression for gearshifts to the relatively large pinion is useful.

In the case of the multi-sprocket arrangement according to the invention, it can be reliably achieved that the chain changes over to a sprocket of relatively small diameter substantially only at gearshift paths. Should the chain nevertheless run in incorrectly, for example owing to multiple shift processes being performed in rapid succession, it is possible, in the case of a sprocket of relatively small diameter which has thin teeth and at least one thick tooth, for the one or more thick teeth to ensure that the chain is immediately synchronized again. For this purpose, the at least one thick tooth of the sprocket of relatively small diameter can, because of its relatively large axial extent, prevent a chain inner link from sliding in.

In the inverse situation, that is to say during the shift to an adjacent sprocket of relatively large diameter, the same conditions will be met with regard to the adherence to the assignment of at least one thick tooth to outer link elements of the chain, and of thin teeth to inner link elements of the chain. Here, through the provision of gearshift aids in the form of gearshift paths involving recesses on the teeth of the sprocket of relatively large diameter, the chain is provided enough space to be displaced in the direction of the sprocket of relatively large diameter in a direction parallel to the axis of rotation of the sprockets. In an embodiment, there is provided at least one shift path such as is already known from gearshift aids of conventional sprockets for a chain which is changing over to the sprocket of relatively large diameter. By contrast to conventional sprockets, it is however likewise possible for particularly deep recesses to be provided where, as viewed in an axial direction, particularly broad chain elements converge on at least one thick tooth with regard to its material thickness.

By contrast to an arrangement of only one sprocket, such as is disclosed in document DE 10 2012 023 819 A1, it is inevitably the case in arrangements of multiple sprockets and gearshift mechanisms or derailleurs that chain guides are used on the gearshift mechanism and/or on the derailleur. The guidance of the chain for the prevention of chain throw-off due to vibrations or skewed chain running is reliably prevented by the chain roller of the rear derailleur of a bicycle gearshift mechanism, and may not have to be assisted by way of the sprocket geometry. Thickened portions of the teeth in the direction of the relatively small pinion are even disadvantageous, as these can oppose a smooth and directed gearshift to relatively large pinions. Furthermore, specifically in the case of modern pinion arrangements with a multiplicity of pinions, the axial structural space is severely limited.

For this reason, in an embodiment, it may be provided that the surfaces of at least some, and preferably all, of the teeth of each of the sprockets on a side pointing toward an adjacent sprocket of relatively small diameter are of substantially planar form and lie substantially in a common plane, wherein the individual teeth which have an impression or a passage recess are set back in relation to said plane. Thus, in this embodiment, it is possible to depart from the principle of the complete adaptation of the tooth thickness to the width of the intermediate spaces between the pair of chain outer links or chain inner links. The at least one thick tooth is thus thickened only on one side as viewed in an axial direction. The chain guidance prevents the chain from being able to be displaced too far in the direction of an adjacent sprocket of relatively large diameter.

It is correspondingly possible for gearshift path geometries known from sprockets with teeth of identical thickness to be transferred to the side of the sprockets which points toward the adjacent sprocket of relatively small diameter.

In this embodiment, the material thickness of thick teeth as viewed in the direction perpendicular to the circumferential direction can be reduced. For example the thick teeth may have a material thickness from 2.2 mm to 3.5 mm. In an embodiment, the material thickness of the thick teeth is equal to or less than 2.45 mm.

The conditions for the adherence to phase assignments must be adhered to equally, both for the shift of the chain to a sprocket of relatively small diameter, and for the shift of the chain to a sprocket of relatively large diameter. Adherence to these two conditions in a single sprocket is not inevitably realized as said conditions may oppose one another, or may be mutually exclusive. Thus, structural measures for decoupling these constraints may be provided. It is possible for gearshift paths for shifting to the sprocket of relatively large diameter to be provided both along a substantially straight profile of the chain, as already described above, and along an arcuate or bent profile of the chain. In the case of an arcuate profile, the teeth at the ends of the gearshift path on adjacent sprockets may be turned toward one another about the axis of rotation of the sprockets. Furthermore, the spacing between the chain pins radially within the chain rollers, which engage the adjacent sprockets, can be shortened.

Furthermore, the shift to a sprocket of relatively large diameter may be realized in the form of a so-called "inner-link ascent" and also in the form of a so-called "outer-link ascent", wherein the corresponding designations are derived from the nature of the final chain link along the gearshift path, which bridges a radial distance radially outward.

The advantages of the multi-sprocket arrangement according to the invention include, but are not limited to, the following:

As the chain lies on the corresponding sprocket toothing in a manner synchronized with the at least one thick tooth and the thin teeth, the need to provide corresponding gearshift aids for the two engagement variants, that is to say for the assignment of an inner link element or of an outer link element to a reference tooth, is eliminated. This reduces the complexity of the arrangement.

Gearshifts to sprockets of relatively small diameter under load are improved. This gives rise to less variation during gearshift processes and a reduced risk of undesired gearshift states.

The vibrations of the chain in the event of skewed running are reduced.

A so-called "auto-shift", that is to say an inadvertent shift of the chain to an adjacent sprocket, can be substantially prevented. Also, the risk of the chain jumping off the sprocket is reduced.

Wear is reduced, because even with the provision of impressions on the teeth, adequately large contact areas between chain rollers and tooth flanks still exist due to the thick teeth that are provided.

In the case of inner-link descent of the chain, it is possible with the invention for a smooth gearshift to be ensured even in the case of large gear steps, that is to say, in the case of large differences between the numbers of teeth of adjacent sprockets.

The multi-sprocket arrangement according to the invention is thus also suitable for use in electric bicycles (E-bikes) or bicycles with an electric drive. The electric bicycles often have relatively large gear steps between adjacent sprockets of a multi-sprocket arrangement in order to realize relatively high acceleration. Furthermore, due to a constant torque of the electric motor, high forces act on the chain. The resulting demands on a multi-sprocket arrangement for a rear wheel hub are met by the multi-sprocket arrangement according to the invention, whereby smooth and reliable gearshifts are realized.

In another embodiment, it may be expedient for the shift of the chain to sprockets with at least one thick tooth and thin teeth to be provided not for all sprockets of a multi-sprocket arrangement. This is the case in particular for multi-sprocket arrangements in which sprockets with relatively small differences in numbers of teeth in relation to adjacent sprockets are provided. If, for example due to the gear steps, it is also intended to use sprockets with odd numbers of teeth in the case of the relatively large pinions. In such a case, it would be possible for a sprocket with an odd number of teeth and with only thin teeth to be arranged between two sprockets with even numbers of teeth and in each case with at least one tooth sequence with a thick tooth arranged between two thin teeth.

It is thus possible, in a further embodiment, for the multi-sprocket arrangement to comprise at least one further sprocket which, as viewed in a direction perpendicular to the circumferential direction, has teeth of substantially identical thickness with regard to their material thickness. The at least one further sprocket may be arranged adjacent to the at least one of the multiplicity of sprockets with at least one thick tooth and thin teeth.

In this embodiment, it is thus possible for conventional sprockets with teeth of uniform thickness and sprockets according to the invention with at least one thick tooth and thin teeth to be provided together in a multi-sprocket arrangement. Consequently, with the use of conventional sprockets in a multi-sprocket arrangement with a small difference in number of teeth between the sprockets, a transition point may be formed from a sprocket of relatively small diameter and teeth of equal thickness below the transition point to a sprocket with at least one thick tooth and thin teeth above the transition point.

In this embodiment, it must be ensured that, during the shift to the first sprocket with at least one thick tooth and thin teeth, the transition sprocket, the chain runs onto said sprocket with the correct phase assignment. This means that an outer link element must engage on the at least one thick tooth, or an inner link element must engage on a thin tooth. During the shift of the chain in the opposite direction across the transition point, synchronicity does not play a significant role.

As the chain runs onto the transition sprocket, an impression provided for the outer link could, with corresponding geometrical design, also receive an inner link. This non-synchronized run-on of the chain from the sprocket of relatively small diameter onto the sprocket of relatively large diameter would then consequently have an adverse effect, because synchronicity of the chain and the toothing on the sprocket of relatively large diameter would not be realized in this situation.

This means that a recess or impression provided, as a constituent part of the gearshift path, on the transition sprocket for an outer link or for an inner link would also always have to receive precisely this associated type of link. The synchronicity between chain and teeth on the transition sprocket is then inevitably realized as a result. The receiving of an "incorrect" or non-associated type of link prevents synchronicity. This is counteracted by the invention.

In a first variant for counteracting, the recess or impression may be designed such that an "incorrect" link cannot be received. As an alternative to this, in a second variant, it can be ensured that, already from the outset, it is always the case that the "correct" link bears against the impression.

In the first variant, the receiving of an "incorrect" chain link in the recess or impression may be prevented through the provision of slide-off bevels. It is accordingly possible for at least one recess or impression to have a slide-off bevel. In association with this, it may be provided that the chain continuously runs off the sprocket of relatively small diameter with alternating positioning, for example through the formation of an odd number of teeth on the sprocket of relatively small diameter.

The second variant may consist in providing the chain on a sprocket below the transition point with an even number of teeth, and causing the chain, during the normal run-off on said sprocket, to ride up on the at least one thick tooth. In the case of this riding-up, an inner link element may set down on the tip of the thick tooth, giving rise to a longer distance along the row of chain links in relation to the distance in the case of chain links engaging normally into the teeth and not riding up. The longer distance can affect a shift from a state in which an inner link element bears against the thick tooth to a state in which, subsequently and during subsequent rotations, an outer link element then engages on the thick tooth.

DETAILED DESCRIPTION OF THE DRAWINGS

In the following text the expressions "thick" and "thin" relate to the material thickness of teeth in a direction perpendicular to the circumferential direction of a sprocket. Furthermore, the expressions "large" and "small" relate, with regard to individual sprockets, to the size of the diameter number of teeth of the respective sprockets.

Figure 1:
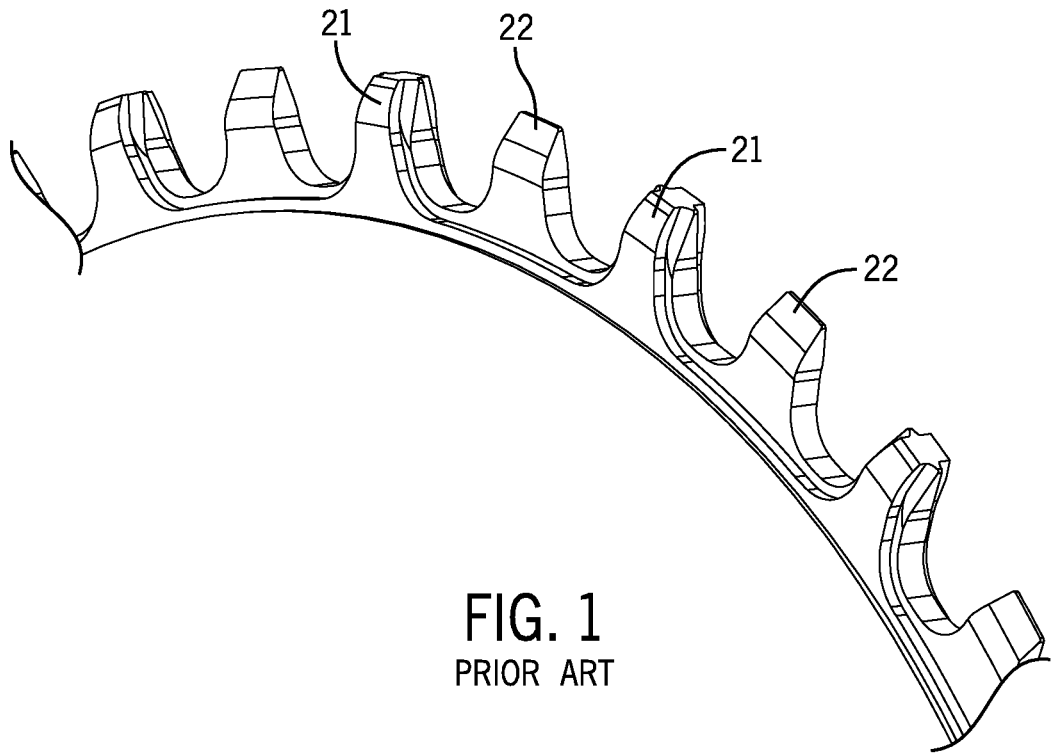
FIG. 1 shows a sprocket with thick and thin teeth from the prior art.

FIG. 1 shows a sprocket with thick teeth 21 and thin teeth 22 from the prior art. This is a sprocket for a pedal crank on a bicycle.

Figure 2:
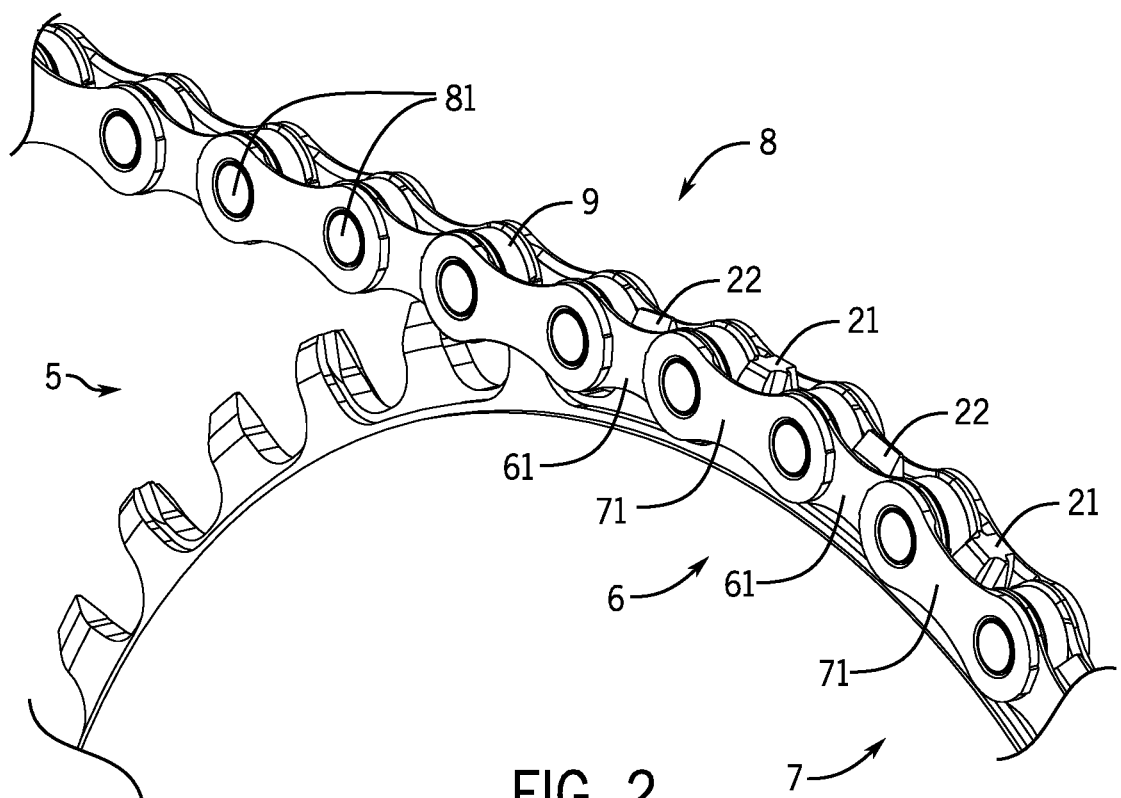
FIG. 2 shows a sprocket as per FIG. 1 with the roller-type chain in engagement.

In FIG. 2, it can be seen how the thick sprocket teeth 21 and the thin sprocket teeth 22 engage the chain 5 in a manner synchronized with the outer link elements 7 and the inner link elements 6 of the chain 5. The tooth shape is based on the principle of the adaptation of the tooth thickness to the width of the intermediate spaces between the pair of chain outer links or chain inner links, respectively.

The chain 5 is in the form of a roller-type chain and has outer link elements 7 and inner link elements 6 which are rotatably connected to one another at chain joints 8. At a chain joint 8, pairs of outer links 71, pairs of inner links 61, and chain rollers are arranged on a chain pin 81. Here, the chain pin 81 is firmly pressed into the outer links 71 and/or is riveted thereto. The inner links 61 have collars on which the chain roller 9 is rotatably mounted. The inner links 61 are rotatable relative to the chain pin 81.

Figure 3:
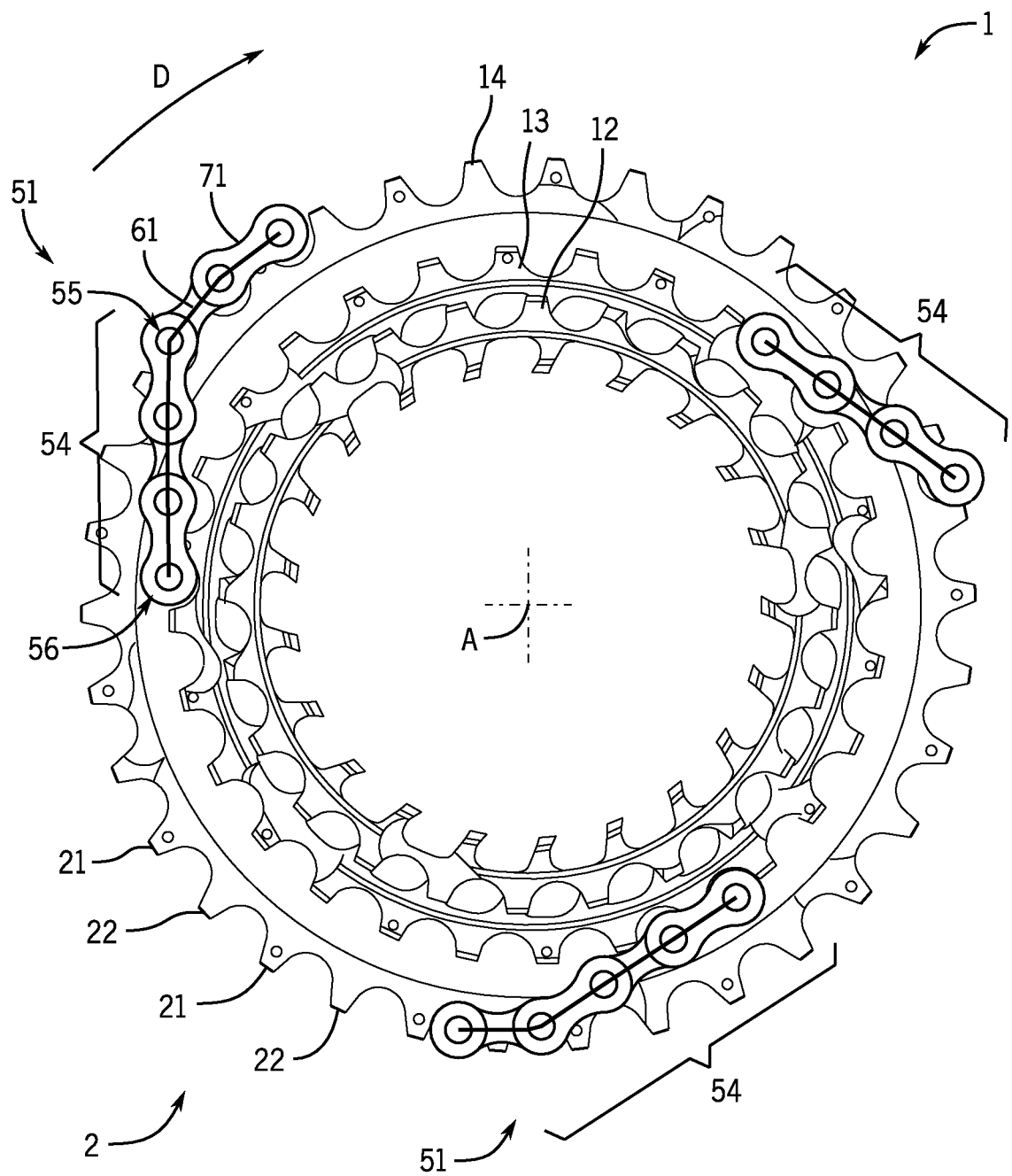
FIG. 3 shows a multi-sprocket arrangement with three illustrated sprockets, with diagrammatic illustrations of the chains changing over between sprockets along gearshift paths, viewed from the side of the smallest sprocket.

FIG. 3 shows a sectional view through a multi-sprocket arrangement 1 according to an embodiment, viewed from the side of the relatively small sprockets, with the three largest sprockets 12, 13 and 14 still being visible. The relatively small sprocket 12 and the medium sprocket 13 belong to an integral conical support structure with apertures. Webs 11 running in a radial direction and in a direction parallel to the axis of rotation A produce the connection between the relatively small sprocket 12 and the medium sprocket 13. The relatively large sprocket 14 is formed as a final sprocket and is, by way of a support disc (not illustrated), supported in a radially inward direction with respect to a driver (not illustrated) and with respect to the hub axle (likewise not illustrated).

In a drive situation, the multi-sprocket arrangement 1 rotates in the direction of rotation D.

On the multi-sprocket arrangement 1 there are arranged, in schematic fashion, multiple chain parts 51 of a chain, in order to illustrate the various states that exist during the shift of the chain 5 from one of the sprockets 12, 13, 14 to an adjacent sprocket. The inner links 61 are illustrated merely schematically by a line between adjacent chain joints. The outlines of the outer links 71 are partially shown. The illustration furthermore does not show whether the teeth are situated within or outside the intermediate space of a pair of outer links 71 or a pair of inner links 61 respectively. Rather, the outlines of the teeth 2 and of the outer links 71 are illustrated equally in schematic form.

The teeth 2 on the sprockets correspond either to thick teeth 21 or to thin teeth 22, wherein the thick teeth 21 are denoted by circles in the tooth body, which circles are not geometric elements on the teeth 2 but merely serve, in the diagrammatic illustration, for distinction with respect to the thin teeth 22. This illustration is necessary as the thick teeth 21 extend only in an axial direction outside the plane of the drawing, and are thus not identifiable in a front view.

The chain parts 51 arranged between the sprockets 12, 13 and 14 are either off-running chain parts, which extend from the sprocket 14 of relatively large diameter to the sprocket 13 of relatively small diameter, or are on-running chain parts, which extend from the sprocket 13 of relatively small diameter to the sprocket 14 of relatively large diameter.

Free chain parts 54 are composed of a subset of the chain links 6, 7 of the off-running chain parts or of the on-running chain parts respectively. The chain joints within free chain parts 54 are not in engagement with teeth 2 of the sprockets 12, 13, 14, wherein "engagement" between sprocket teeth 2 and chain elements is characterized by the fact that the respective sprocket tooth 2 has entered the intermediate space between the chain links 61, 71 of a respective chain link pair, and the fact that the chain roller 9 is situated radially within the gap between the sprocket teeth 2. At the ends of free chain parts 54 there is situated in each case one angled joint 55, assigned to the relatively large sprocket 13, 14, and a tangential joint 56, assigned to the relatively small sprocket 12, 13. The chain pin 81 at the angled joint 55 is situated substantially centrally between two teeth 2 on the sprocket 14, 13 with the relatively large diameter, and connects chain elements 6, 7 which are angled relative to one another. The chain pin at a tangential joint 56 is the first chain joint 8 whose chain roller is situated substantially centrally between two teeth 2 on the sprocket 13, 12 with the relatively small diameter, wherein there, the chain runs in onto the relatively small sprocket 12, 13 tangentially.

Figure 4:
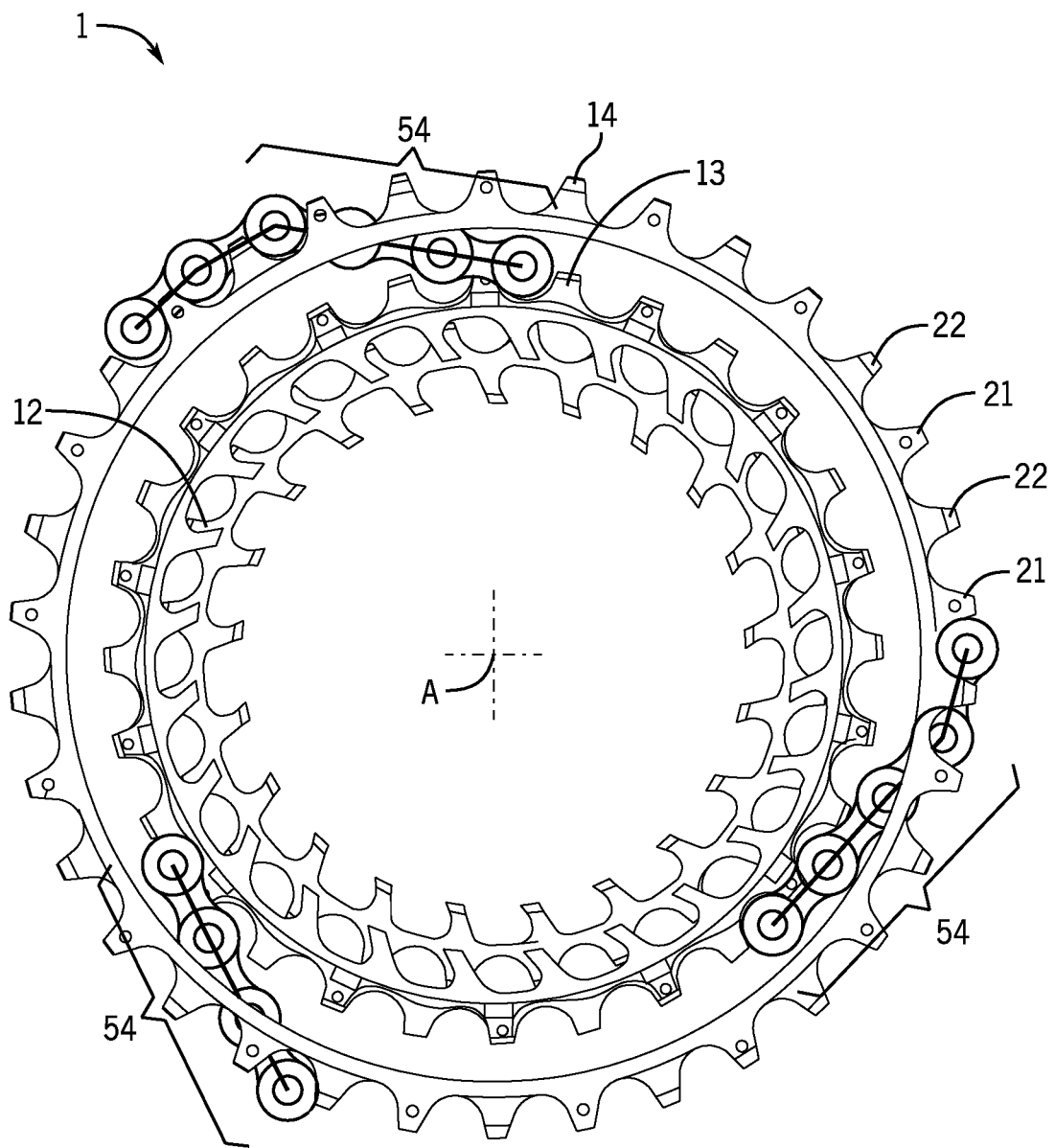
FIG. 4 shows a multi-sprocket arrangement as per FIG. 3, viewed from the side of the largest sprocket.

FIG. 4 shows the multi-sprocket arrangement as per FIG. 3, but viewed from the side of the largest sprocket 14. Constituent parts of the sprockets which are situated radially further to the inside and which are not essential to gearshift processes are not illustrated.

During gearshifts to a relatively large sprocket, the expression "outer-link ascent" is used if the tooth of the relatively large pinion on whose run-in flank the end of the free chain part 54 is supported receives an outer link. If said tooth is passed by an inner link, the ascent is an inner-link ascent. The free chain parts in FIGS. 3 and 4 are denoted correspondingly.

Figure 5:
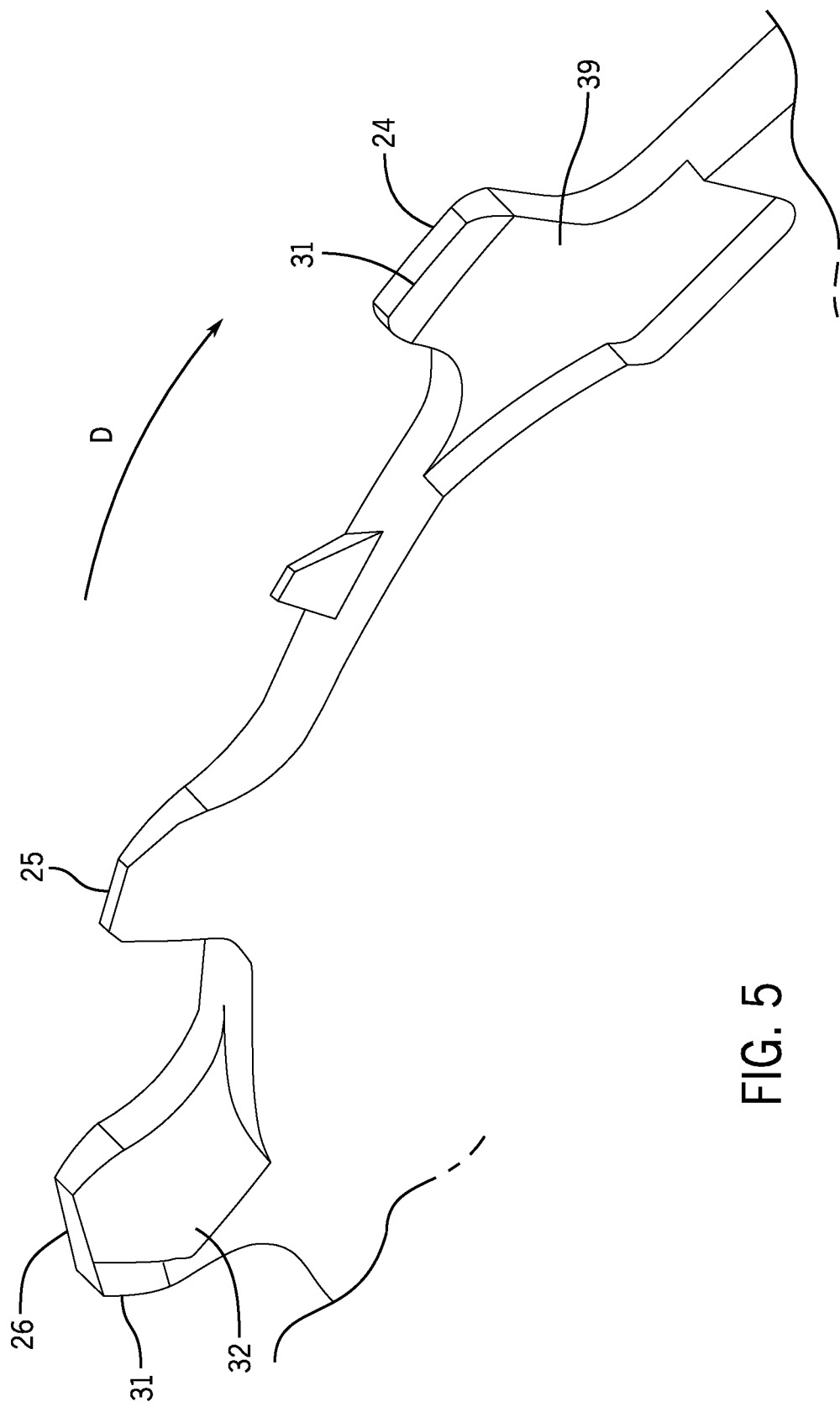
FIG. 5 shows a sprocket of a multi-sprocket arrangement having a beveled tooth for assisting the shift of the chain onto the next smallest sprocket in the case of a conventional multi-sprocket arrangement.

FIG. 5 shows a sprocket of a multi-sprocket arrangement from the prior art. A beveled passage tooth 26 provides space for an inner link element to pass the passage tooth 26 in the case of inner-link passage.

Figure 6:
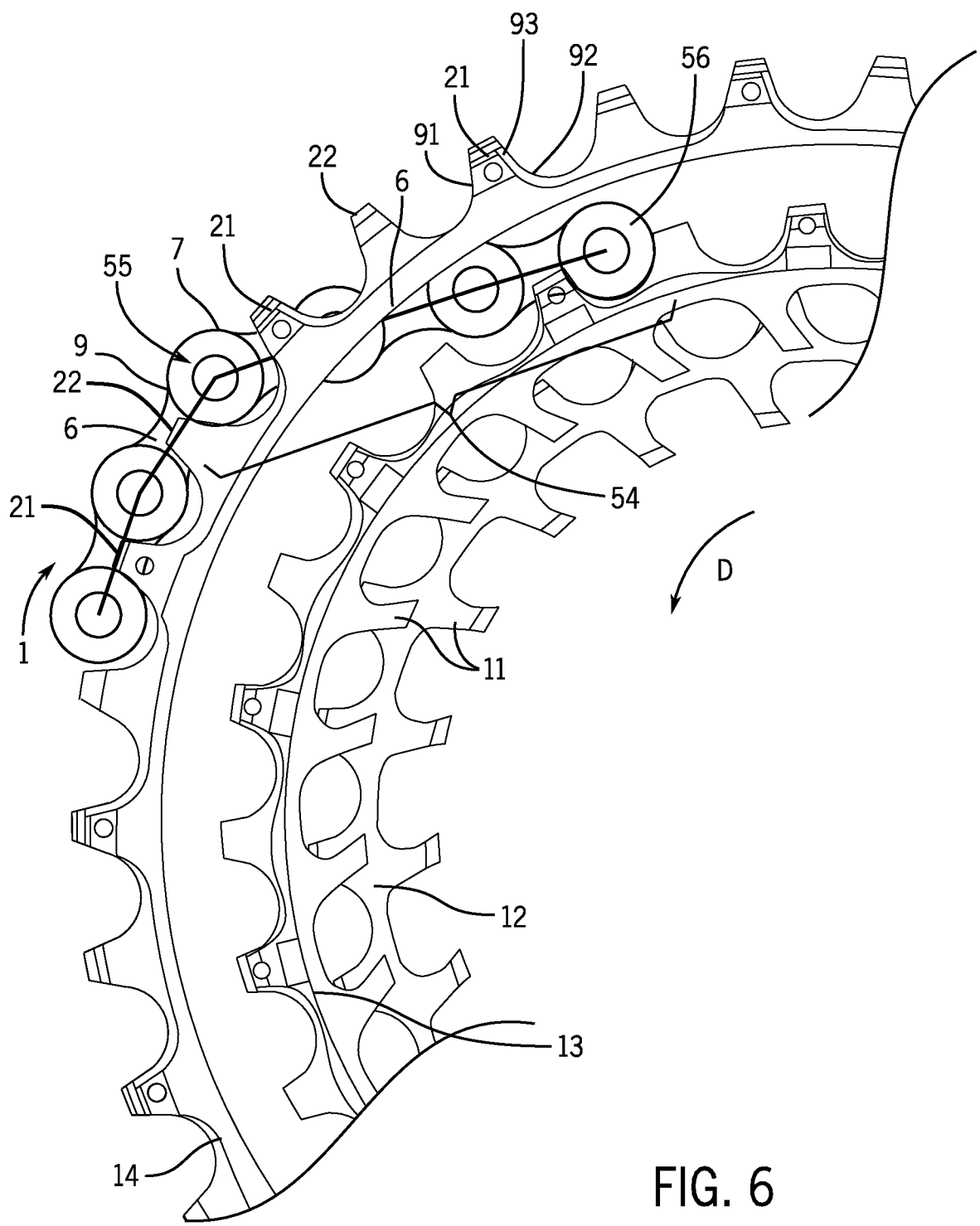
FIG. 6 shows a detail of the multi-sprocket arrangement as per FIG. 4, viewed from the side of the largest sprocket, for a shift of the chain to the relatively small sprocket.

FIG. 6 shows inner-link descent in the case of a sprocket according to the invention, viewed from the side of the largest sprocket 14. The inner link 61 is the first chain element departing from the pinion. Even if the angling of the chain first occurs at the outer link (as it is held by the edge 37), the inner link 61 is already no longer engaged with the pinion.

It is shown in FIGS. 4 and 6, that the thick teeth 21 of the largest sprocket 14 have a load carrying tooth flank (leading in rotational direction D) 91, which is formed with full material thickness. However, the portion around the following tooth flank on the opposite side (back flank) 92 of these thick teeth 21 is, in regard to the material thickness, provided with a stepped profile and has a recess 93 at least partially along its contour, such that as viewed in a radially inward direction it provides a stepped or shoulder-formed tooth profile. Considering the aspect that the backside of the sprocket 14 is formed substantially planar (see FIG. 7), a tangential section through such a tooth 21 provides an L-profile in a top view.

Figure 7:
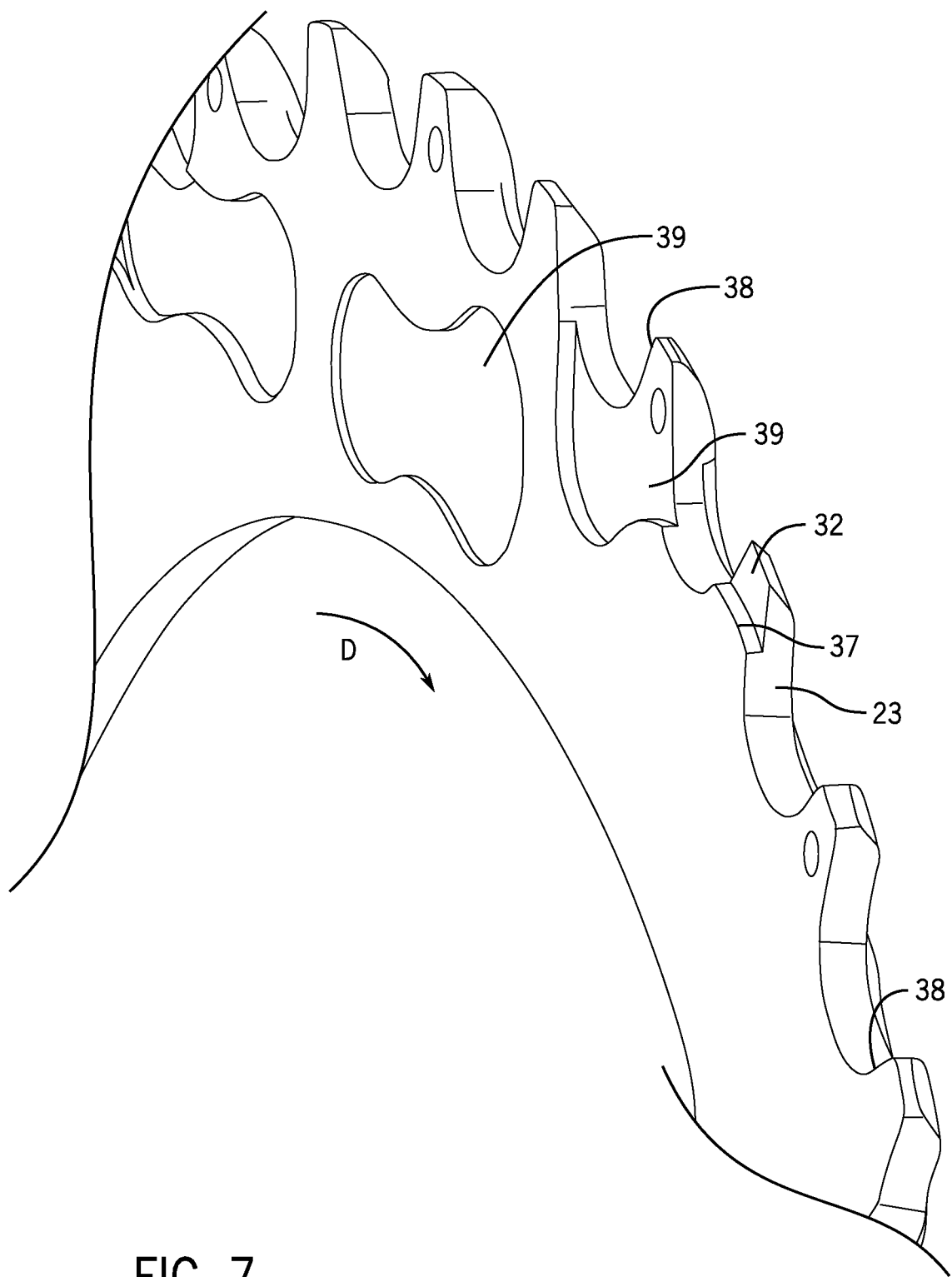
FIG. 7 shows recesses or impressions along the gearshift path for a shift of the chain to the relatively small sprocket correspondingly to FIG. 6, in the case of which inner-link passage takes place.

FIG. 7 shows an embodiment including recesses or impressions 39, such as a passage recess 32, along the gearshift path for a shift to the relatively small sprocket when it is intended for inner-link descent as per FIG. 6 to take place. The inner link passes the tooth 22, which provides corresponding space by way of the impression on the front side. The recess or impression 39 provides space for the outer link.

Figure 8:
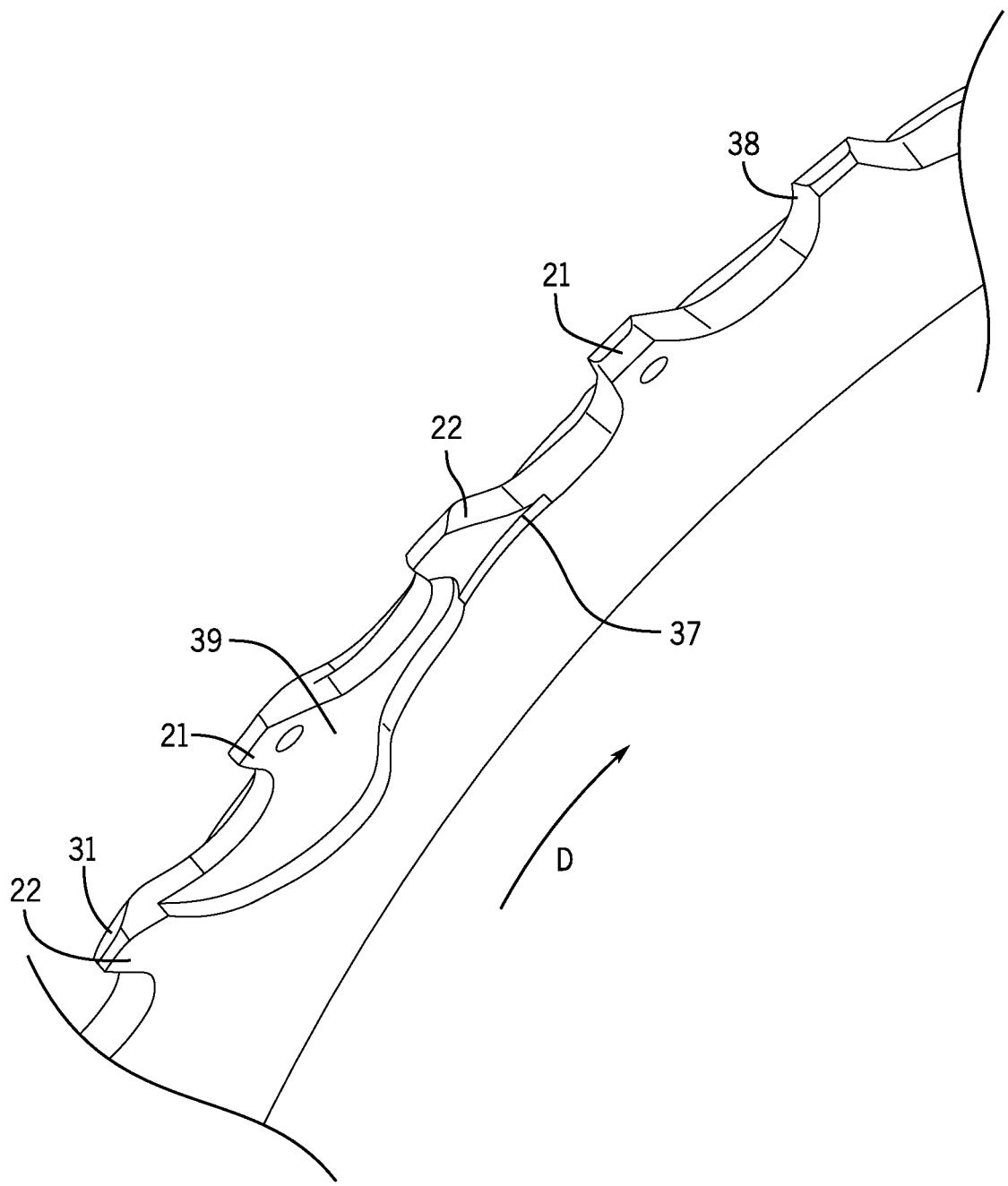
FIG. 8 shows recesses or impressions along the gearshift path for a shift to the relatively small sprocket in an embodiment, in the case of which, as in FIG. 7, inner-link passage takes place in conjunction with inner-link descent.

FIG. 8 illustrates the recesses or impressions 39 along the gearshift path for a shift to the relatively small sprocket, modified in relation to the embodiment as per FIG. 7, to illustrate when an inner-link passage past the passage tooth 23 takes place. It can be seen that the impression 39 for an outer link runs radially inward more steeply than is the case in FIG. 7. Thus, in relation to FIG. 7, earlier angling of the chain is realized, with the result that a slightly greater chain length is provided for the run-in into the adjacent, relatively small pinion. Thus, the relatively small pinion can be rotationally offset with respect to the relatively large pinion in a direction opposite to the drive direction.

The radial position of the support edge 37 on the impression 39 determines the extent to which an outer link received in said impression 39 can be displaced radially inward.

Figure 9:
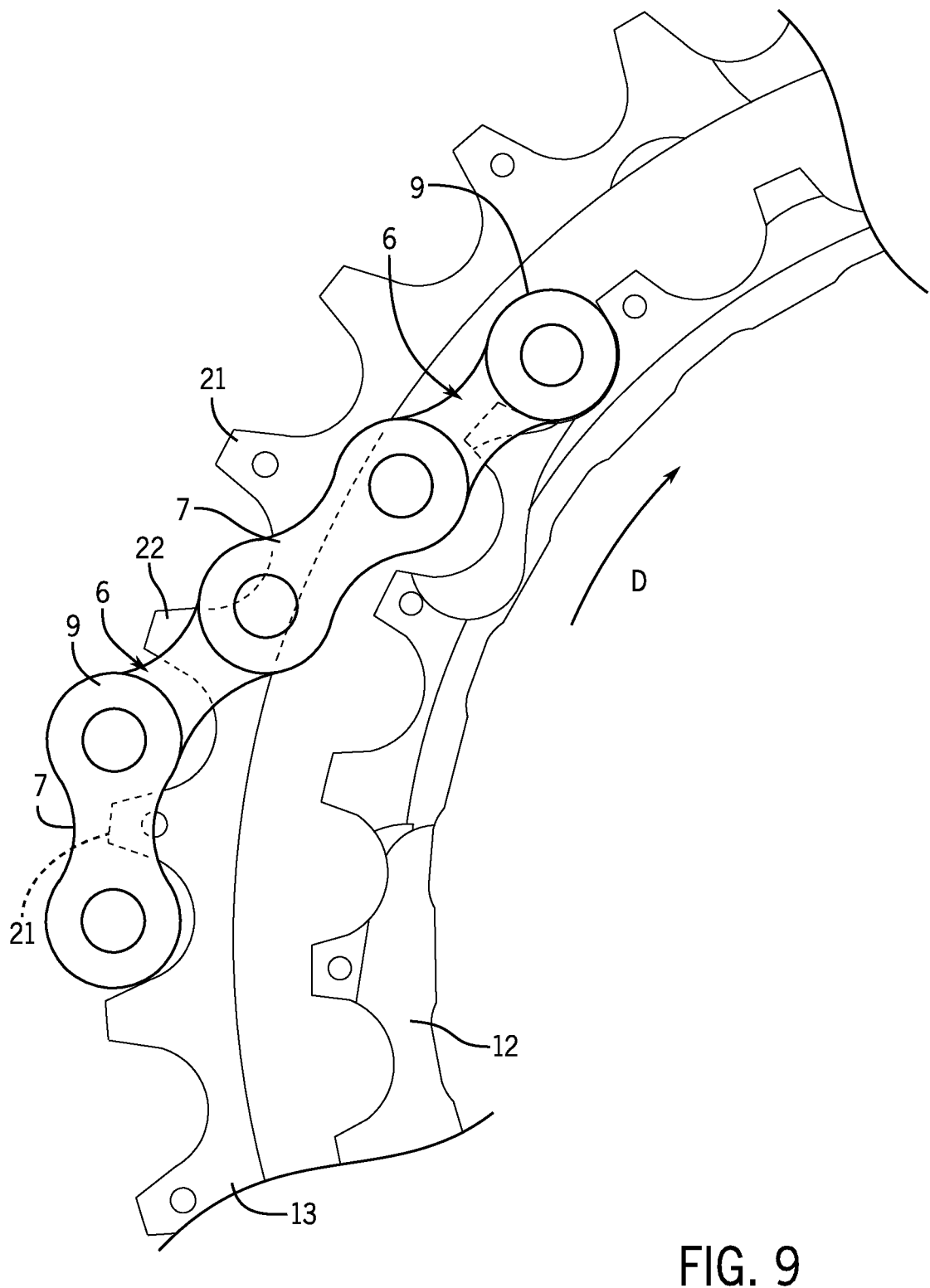
FIG. 9 is a schematic illustration of the shift to a relatively large sprocket of the multi-sprocket arrangement as per FIG. 4, viewed from the side of the relatively small sprocket, in the case of which inner-link passage takes place in conjunction with inner-link ascent.

FIG. 9 schematically shows the shift to a relatively large sprocket on the multi-sprocket arrangement as per FIGS. 3 and 4, viewed from the side of the relatively small sprocket. The tooth 22 receives an outer link as is indicated when the chain lies on the run-in flank of the tooth 22.

Figure 10:
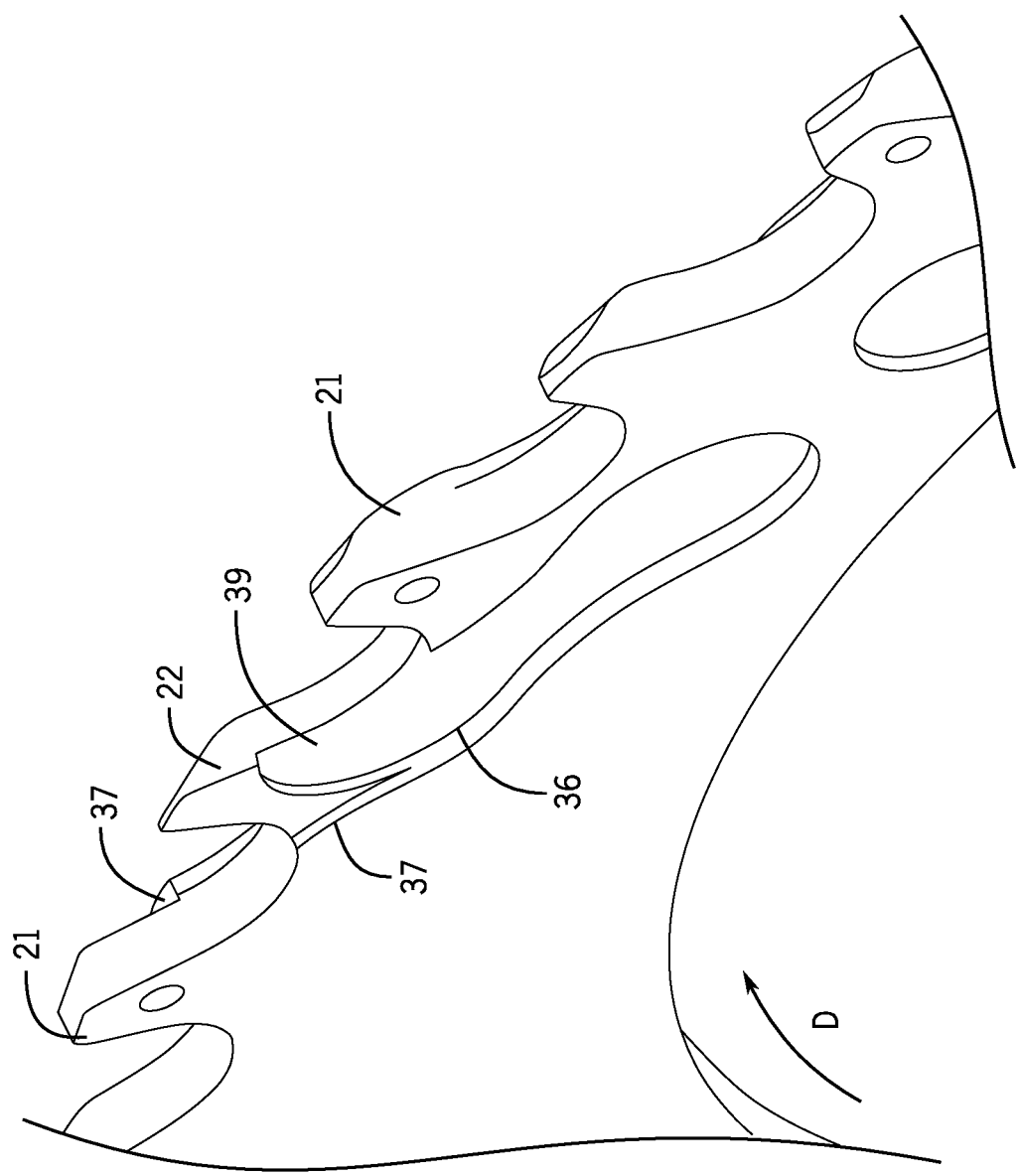
FIG. 10 shows details of the gearshift path for the shift to a relatively large sprocket as per FIG. 9.

FIG. 10 shows details of the gearshift path for a shift process as per FIG. 9, viewed from the side of the relatively small sprocket. It is possible to see the extent to which a ramp 36 can extend in order to provide space for the outer link and in order to support the outer link in a radially inward direction by way of the support edge 37. The edge 37 extends across a double recess or impression for an outer link and an inner link. The edge 37 supports the inner link.

The main supporting function is however realized primarily by the run-in flank on the tooth 21.

If, proceeding from the phase assignment illustrated in FIGS. 3 and 4, the sprockets 12, 13 are rotated relative to one another in terms of their angular position, such that, corresponding to the angular offset, the tangential joint 56 and the angled joint 55 move toward one another, then the angled joint 55 changes its position in a radially outward direction. This gives rise to an angled or arcuate profile of the free chain part 54, which can be further intensified through corresponding positioning of the impression 39. The radial position of the support edge 37 is also to be configured correspondingly. The extent of the movement toward one another in the case of the arrangement of the two sprockets 12, 13 is limited by the fact that the impression should not extend as far as the load flank 38 (FIG. 7) of the deflecting tooth 24 (FIG. 5), in order that as large an area as possible for the contact between load flank 38 and chain roller 9 is provided on the deflecting tooth 24. A correspondingly possible design is shown in FIG. 10.

Figure 11:
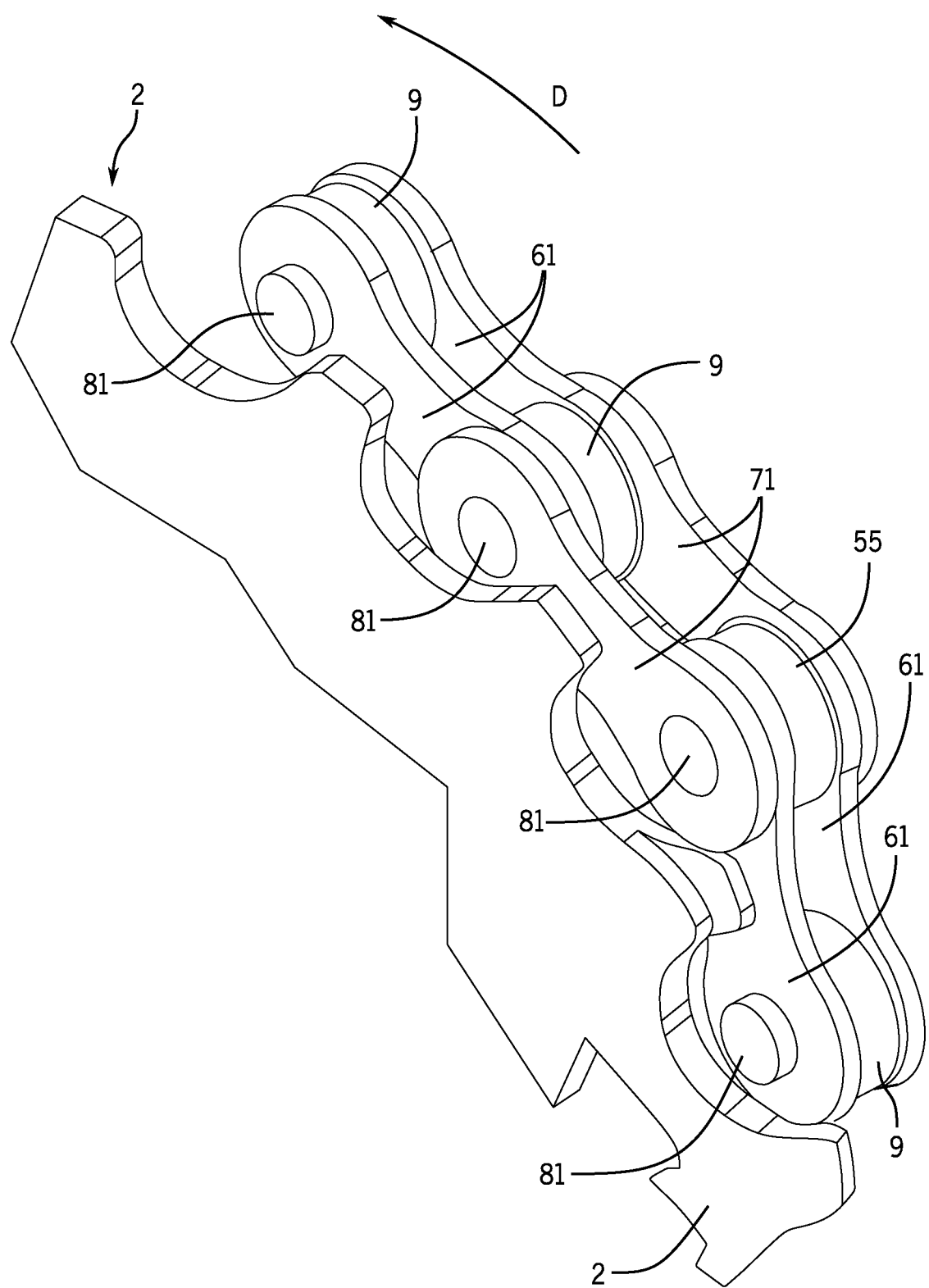
FIG. 11 is an illustration of sprocket and chain during a shifting process with outer-link ascent in combination with inner-link passage on a sprocket of a conventional multi-sprocket arrangement.

FIG. 11 is an illustration of an impression for outer-link ascent in combination with inner-link passage on a sprocket of a multi-sprocket arrangement.

Figure 12:
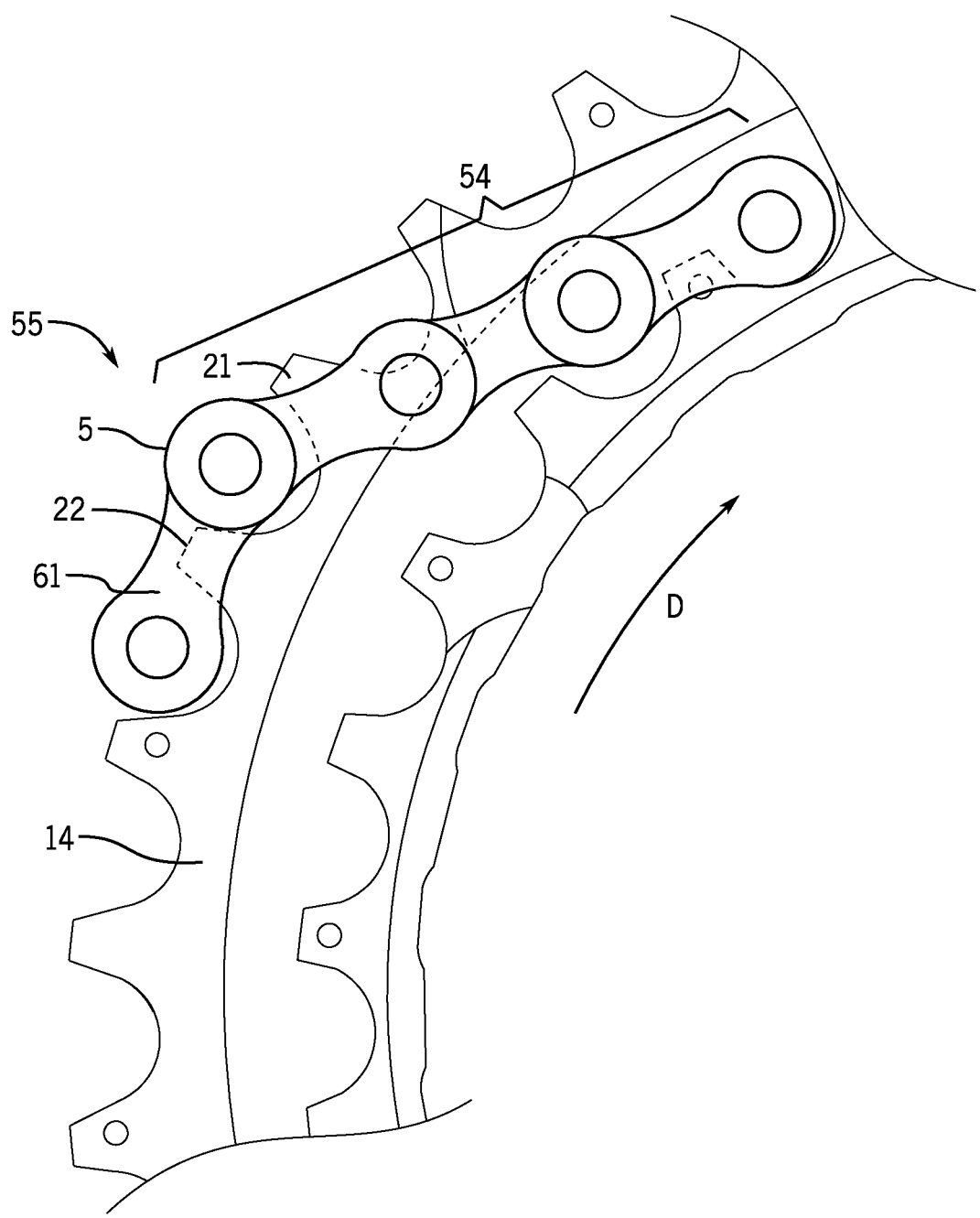
FIG. 12 is a schematic illustration of the shift to a relatively large sprocket as per FIG. 4, viewed from the side of the relatively small sprocket, in which outer-link ascent with subsequent inner-link passage take place.
Figure 13:
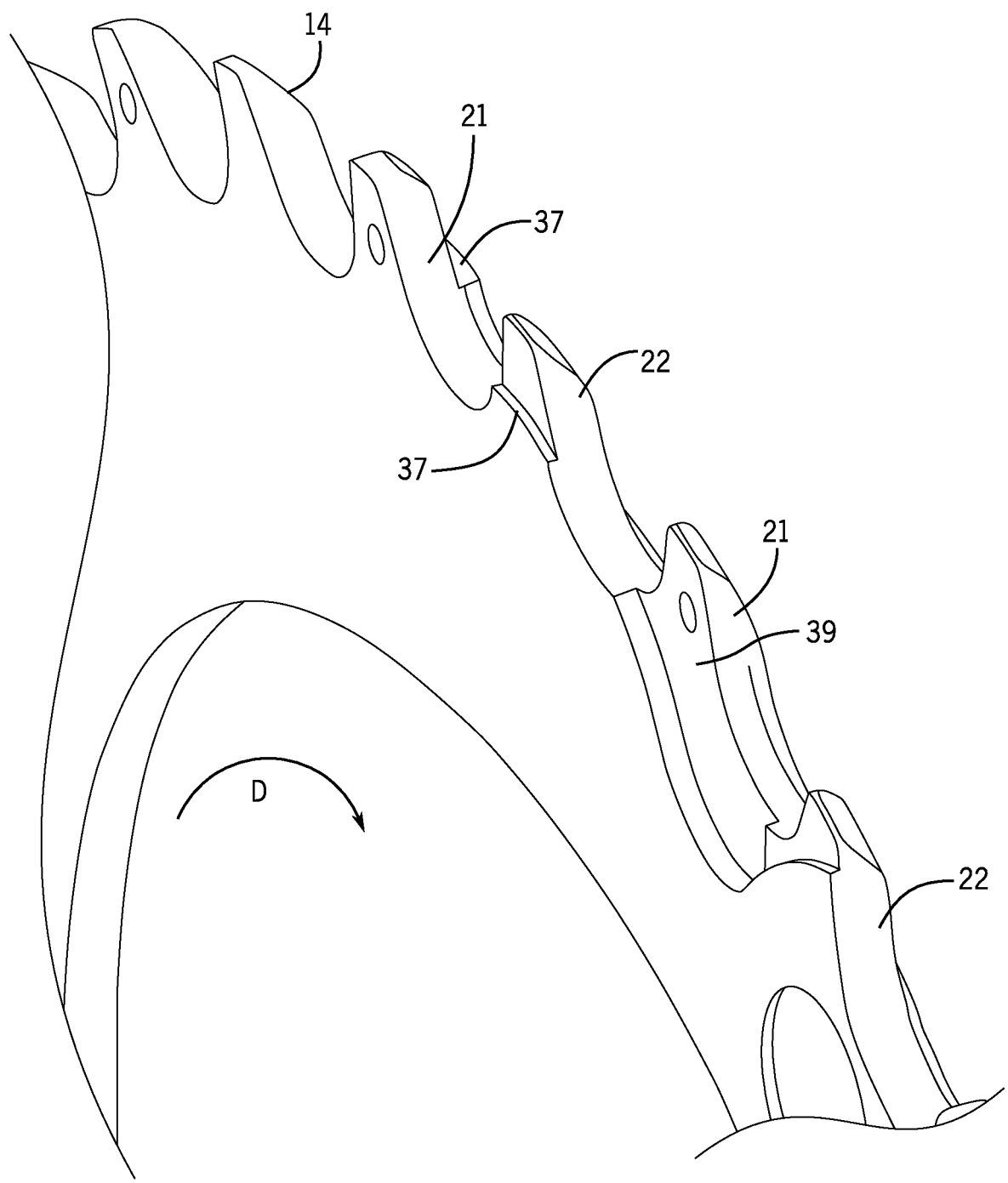
FIG. 13 shows details of the gearshift path for the shift to a relatively large sprocket as per FIG. 12.
Figure 14:
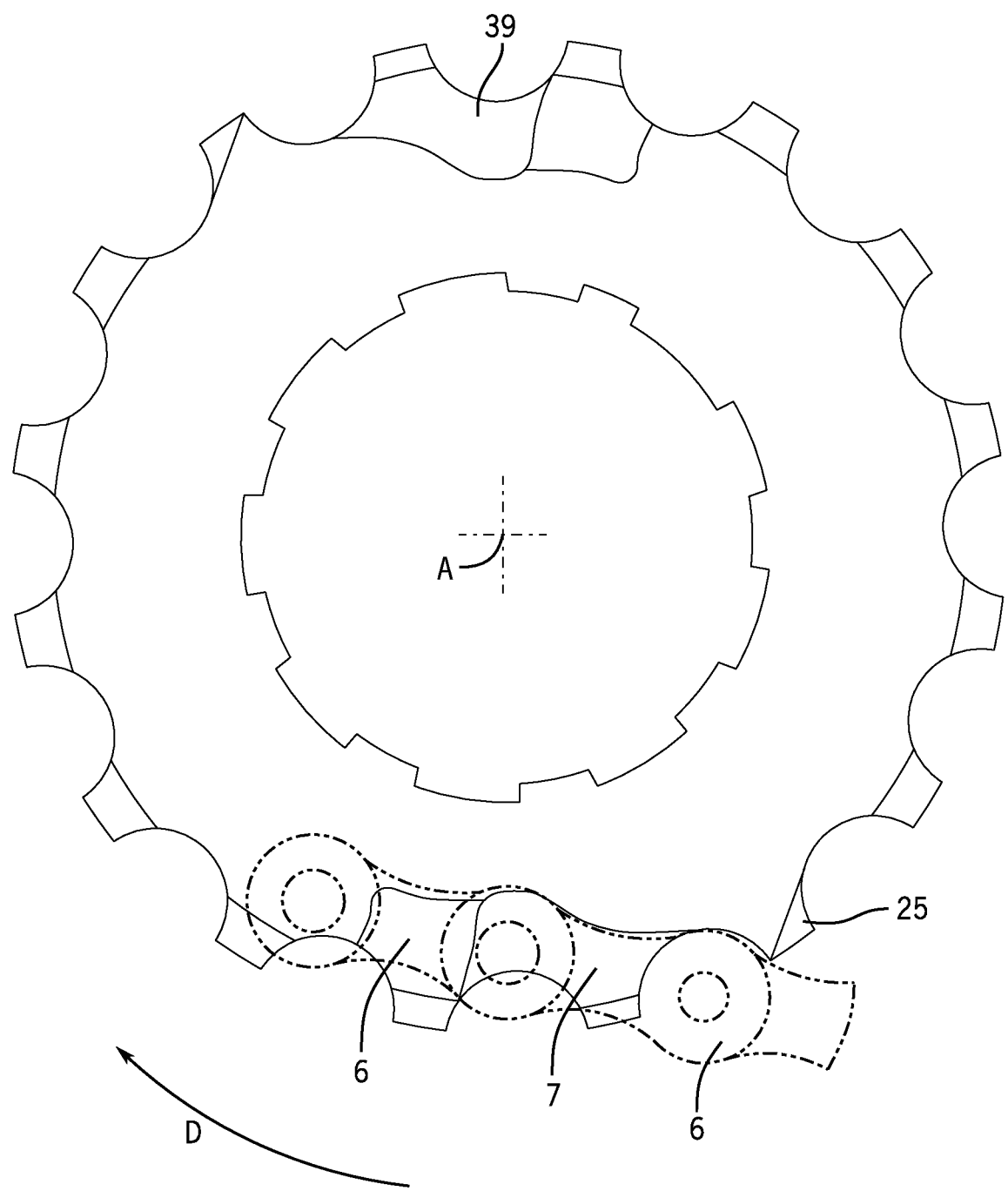
FIG. 14 shows a sprocket of a multi-sprocket arrangement with an impression or gearshift path in the case of a conventional multi-sprocket arrangement, in the case of which either inner-link ascent in combination with inner-link passage or outer-link ascent with subsequent inner-link passage take place.

FIG. 12 schematically shows the shift to a relatively large sprocket 14 in the case of the multi-sprocket arrangement as per FIGS. 3 and 4, viewed from the side of the relatively small sprocket 13. The thin tooth 22, on whose run-in flank the chain 5 lies, is suitable for receiving an inner link 61, wherein the inner link 61, during the ascent, does not engage but bears against the impression. FIG. 13 shows the details of the gearshift path for the gearshift to a relatively large sprocket 14 of the multi-sprocket arrangement during a gearshift process as per FIG. 12. FIG. 14 shows a sprocket of a conventional multi-sprocket arrangement with an impression 39 in the first possible engagement situation in which outer-link ascent with subsequent inner-link passage take place. Here, the impression 39 receives the outer link of an outer link element.

On the transition sprocket, use may be made of a design corresponding to FIGS. 10 and/or 12 if corresponding adaptations are made to the present thick and thin teeth and further conditions are observed.

Figure 15:
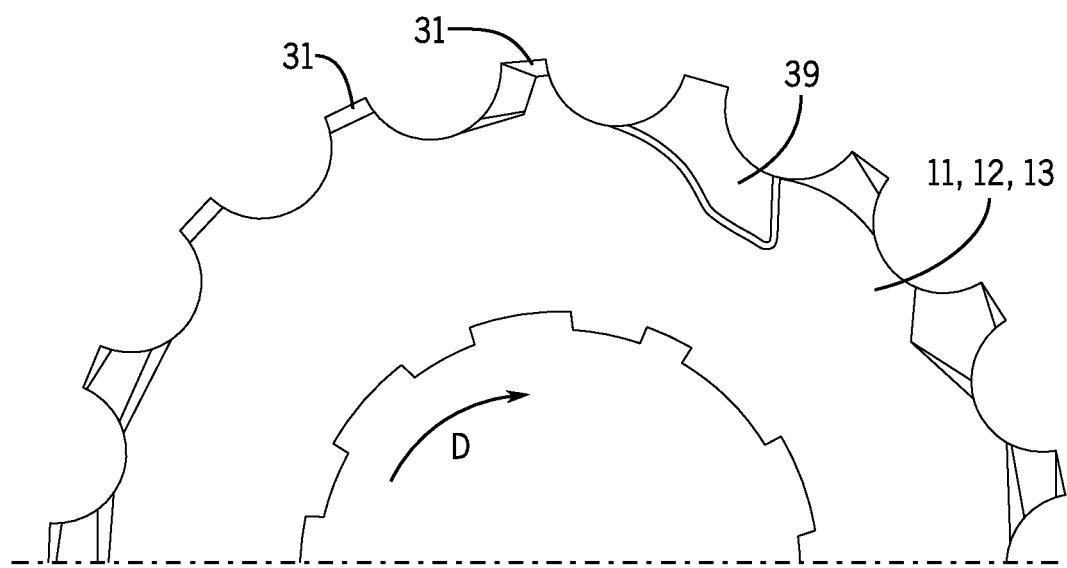
FIGS. 15 and 16 are illustrations of an impression on a sprocket of a conventional multi-sprocket arrangement, in the case of which the engagement of an outer link element on a tooth suitable for the engagement of said outer link element is prevented.

FIG. 15 shows an impression on a sprocket of a multi-sprocket arrangement for inner-link ascent with subsequent outer-link passage. The at least one tooth which is thickened in the direction perpendicular to the plane of the drawing is not illustrated in any more detail.

Figure 16:
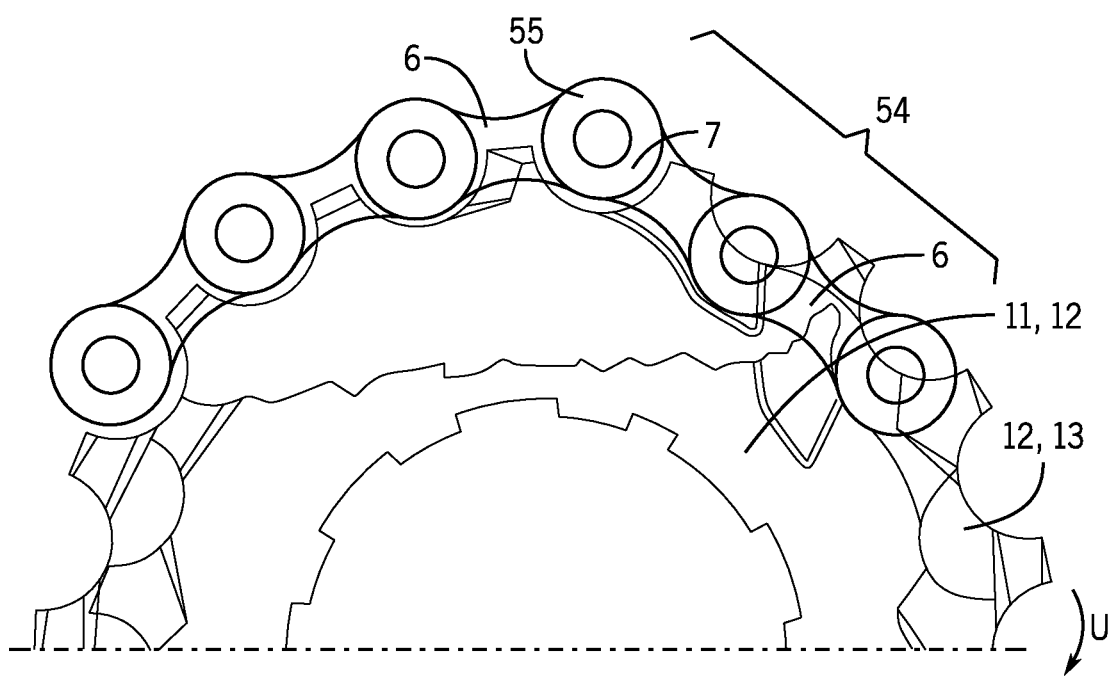

FIG. 16 illustrates an assignment of the chain in the case of inner-link ascent. The following outer link 7 does not come into engagement, but rather is deflected, leading to a passage of said outer link 7 and also of the subsequent inner link 6. In this way, the engagement of an outer link element on a tooth which is actually suitable for the engagement of said outer link element is prevented.

With corresponding adaptations, this structural approach can be utilized for a gearshift path and a catching tooth on a transition sprocket with outer-link ascent with subsequent inner-link passage as per FIG. 14.

The present invention shows how individual sprockets of a multi-sprocket arrangement can be designed in order that a displacement of the chain during a gear change can be performed reliably and quickly through corresponding gearshift paths both from a relatively small sprocket to a relatively large sprocket and also in the opposite direction from a relatively large sprocket to a relatively small sprocket, and here, it is also ensured that the chain is reliably guided on the sprocket.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A multi-sprocket arrangement for a rear wheel hub of a bicycle, the multi-sprocket arrangement comprising:
a plurality of sprockets of different diameters, wherein at least one sprocket of the plurality of sprockets has a plurality of teeth on the circumference of the at least one sprocket, the plurality of teeth including a thin tooth followed by a thick tooth with the thick tooth followed in turn by another thin tooth in series, and
wherein, on the at least one sprocket of the plurality of sprockets, there is provided at least one impression and/or a passage recess formed on an axial front side of the at least one sprocket that forms at least one gearshift path that permits a shift between two adjacent sprockets,
wherein the impression and/or passage recess is on at least one tooth of the plurality of teeth, the at least one sprocket having a relatively larger diameter, the at least one tooth forming a passage tooth provided for the passage of an inner link of the chain in order for the chain to descend onto an adjacent sprocket of relatively smaller diameter.

2. The multi-sprocket arrangement of claim 1, wherein the series of teeth is repeated at least two times along the circumferential direction of the at least one sprocket.

3. The multi-sprocket arrangement of claim 1, wherein surfaces of at least some of the plurality of teeth of the at least one sprocket of the plurality of sprockets on a side pointing toward an adjacent sprocket of relatively small diameter lie substantially in a common plane, wherein at least one tooth has an impression or a passage recess and are axially set back in relation to said plane.

4. The multi-sprocket arrangement of claim 1, wherein at least one sprocket of relatively smaller diameter is oriented, in terms of phase, with respect to an adjacent sprocket of relatively larger diameter such that during a shift from the sprocket of relatively larger diameter to the sprocket of relatively smaller diameter synchronicity between teeth of the sprocket of relatively smaller diameter and respectively associated chain elements of the chain is realized.

5. The multi-sprocket arrangement of claim 1, wherein at least one sprocket of relatively smaller diameter is oriented, in terms of phase, with respect to an adjacent sprocket of relatively larger diameter such that during a shift from the sprocket of relatively smaller diameter to the sprocket of relatively larger diameter synchronicity between the teeth of the sprocket of relatively larger diameter and respectively associated chain elements of the chain is realized.

6. The multi-sprocket arrangement of claim 1, wherein the multi-sprocket arrangement comprises at least one further sprocket which, as viewed in a direction perpendicular to the circumferential direction, has teeth of substantially identical thickness, and which is arranged adjacent to the at least one sprocket with thick and thin teeth.

7. The multi-sprocket arrangement of claim 1, wherein an at least one sprocket of relatively smaller diameter has, as viewed in a direction perpendicular to the circumferential direction, thick teeth and thin teeth.

8. The multi-sprocket arrangement of claim 1, wherein at least one tooth of the plurality of the teeth has a support edge which is designed to support an inner link or an outer link of the chain in a radially inward direction with respect to the axis of rotation of the associated sprocket.

9. The multi-sprocket arrangement of claim 1, wherein the at least one gearshift path comprises at least one impression having a slide-off bevel which prevents an unintended link of the chain from being received therein.

10. The multi-sprocket arrangement of claim 1, wherein teeth of adjacent sprockets at the ends of the gearshift path are turned toward one another about the axis of rotation of the sprockets.

11. The multi-sprocket arrangement of claim 1, wherein a sprocket with a thick tooth which is arranged adjacent to a transition sprocket of relatively small diameter and without a thick tooth has gearshift impressions or passage recesses which are suitable for allowing an outer link to ascend, and preventing an inner link from ascending, at a defined position.

12. The multi-sprocket arrangement of claim 1, wherein a sprocket with a thick tooth, which is arranged adjacent to a transition sprocket of relatively small diameter and without a thick tooth, has gearshift impressions or passage recesses which are suitable for allowing an inner link to ascend, and preventing an outer link from ascending, at a defined position.

13. The multi-sprocket arrangement of claim 1, wherein a thickness of the thick tooth as viewed perpendicular to the circumferential direction is wider than the inner chain link spacing.

14. The multi-sprocket arrangement of claim 13, wherein the thick tooth is disposed on at least one sprocket with smaller diameter.

15. The multi-sprocket arrangement of claim 1, wherein the thick tooth has a load carrying tooth flank which is formed with full material thickness, and a portion around the back flank of the thick teeth has a recess at least partially along the contour of the thick tooth.

16. The multi-sprocket arrangement of claim 1, wherein the thick tooth is thickened only on one side as viewed in an axial direction.

17. The multi-sprocket arrangement of claim 16, wherein the thick tooth is thickened only on a first side of the thick tooth, the first side opposite a second side of the thick tooth, the second side facing a sprocket of relatively small diameter.

* * * * *